(12) United States Patent
Ogata et al.

(10) Patent No.: US 9,071,713 B2
(45) Date of Patent: Jun. 30, 2015

(54) IMAGE FORMING APPARATUS HAVING MULTIPLE SHEET FEEDING PATHS FOR DOUBLE SIDE PROCESSING

(71) Applicant: CANON KABUSHIKI KAISHA, Tokyo (JP)

(72) Inventors: Atsushi Ogata, Mishima (JP); Ichiro Yasumaru, Mishima (JP); Kazushi Ino, Suntou-gun (JP); Hiroshi Kato, Odawara (JP); Daisuke Kaneko, Suntou-gun (JP); Hiroki Kato, Gotemba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/261,579

(22) Filed: Apr. 25, 2014

(65) Prior Publication Data
US 2014/0327921 A1 Nov. 6, 2014

(30) Foreign Application Priority Data

May 2, 2013 (JP) .................................. 2013-096889

(51) Int. Cl.
*G06F 15/00* (2006.01)
*H04N 1/00* (2006.01)
*H04N 1/04* (2006.01)

(52) U.S. Cl.
CPC .............................. *H04N 1/00572* (2013.01)

(58) Field of Classification Search
CPC ....... H04N 1/193; H04N 1/12; H04N 1/0057; H04N 1/00572; H04N 1/121; H04N 2201/00631
USPC .................... 358/1.1, 1.3, 1.5, 1.12, 496, 498
See application file for complete search history.

(56) References Cited

U.S. PATENT DOCUMENTS

| | | | |
|---|---|---|---|
| 6,318,718 B1 | 11/2001 | Ogata et al. | |
| 6,325,371 B1 * | 12/2001 | Araki et al. | 271/297 |
| 6,804,473 B2 | 10/2004 | Nakamura et al. | |
| 6,826,374 B2 | 11/2004 | Kato et al. | |
| 6,973,285 B2 | 12/2005 | Sekiyama et al. | |
| 6,997,449 B2 | 2/2006 | Obuchi et al. | |
| 7,050,751 B2 | 5/2006 | Watanabe et al. | |
| 7,597,311 B2 | 10/2009 | Kawata et al. | |
| 8,434,753 B2 | 5/2013 | Fukatsu et al. | |
| 8,720,886 B2 | 5/2014 | Kuroda et al. | |
| 2007/0109614 A1 * | 5/2007 | Iwago et al. | 358/498 |
| 2011/0242180 A1 * | 10/2011 | Yamamoto | 347/16 |
| 2013/0181394 A1 | 7/2013 | Ogata et al. | |
| 2013/0293909 A1 | 11/2013 | Endo et al. | |

FOREIGN PATENT DOCUMENTS

| | | |
|---|---|---|
| JP | 10-129071 A | 5/1998 |
| JP | 2006-232467 A | 9/2006 |

* cited by examiner

*Primary Examiner* — Gabriel Garcia
(74) *Attorney, Agent, or Firm* — Fitzpatrick, Cella, Harper & Scinto

(57) ABSTRACT

The image forming apparatus includes an image forming unit, a reading unit, first and second original sheet conveyance paths, a common conveyance path in which a recording material or the original sheet is conveyed to form an image, a third original sheet conveyance path that connects the first original sheet conveyance path and the second original sheet conveyance path and is used for conveying the original sheet conveyed in the second original sheet conveyance path to the common conveyance path, and a control unit that controls so as to convey the original sheet conveyed in the second original sheet conveyance path to the common conveyance path via the third original sheet conveyance path, and form an image on the original sheet.

33 Claims, 8 Drawing Sheets

IMAGE FORMING APPARATUS HAVING MULTIPLE SHEET FEEDING PATHS FOR DOUBLE SIDE PROCESSING

BACKGROUND OF THE INVENTION

1. Field of the Invention

The present invention relates to an image forming apparatus with an image reading apparatus, such as a copier or a multi-function printer (MFP).

2. Description of the Related Art

As an apparatus that realizes both image forming onto a recording sheet and reading of an image on an original sheet, an image forming apparatus with an image reading apparatus is available that includes an automatic document feeder unit (ADF) at an upper portion of an image forming apparatus main unit, and in which an image reading unit is disposed that is capable of performing flow reading with respect to original sheet.

An image forming apparatus capable of double-sided printing on a recording sheet includes a double-side-print conveyance path for switching back a recording sheet after completing a process to form an image on a front surface side of the recording sheet, and conveying the recording sheet once again to an image forming unit to form an image on the rear surface side of the recording sheet. A similar operation is also performed in an image reading apparatus that is capable of double-sided reading of an original sheet. In a typical image forming apparatus with an image reading apparatus, a dedicated conveyance path for a recording sheet is provided in an image forming unit, and a dedicated conveyance path for an original sheet is provided in an image reading unit. Further, to enable both double-sided printing and double-sided reading, it is necessary to provide two double-side-print conveyance paths that are used for a recording sheet and an original sheet, respectively, and there is a concern that the size of the apparatus will increase as a result. To solve this problem, Japanese Patent Application Laid-Open No. 2006-232467 discloses a configuration in which a double-side-print conveyance path for a recording sheet also serves as a conveyance path for flow reading of an original-sheet. Further, Japanese Patent Application Laid-Open No. H10-129071 discloses technology that reads an image printed on an original sheet, creates an overwriting image based on the image, and performs overwriting printing onto the original sheet that was read.

Further, according to the configuration disclosed in Japanese Patent Application Laid-Open No. 2006-232467, an operation is described that reads both sides of an original sheet by reading one side of the original sheet and thereafter passing the original sheet directly through an image forming unit without stopping and conveying the original sheet again to an image sensor by a double-side reversing unit of the image forming unit.

Although Japanese Patent Application Laid-Open No. 2006-232467 discloses a configuration in which a double-side-print conveyance path is used for both an original sheet and a recording sheet, an operation for overwriting an image on an original sheet that was read is not discussed therein. According to the configuration disclosed in Japanese Patent Application Laid-Open No. 2006-232467, for example, in a case where operations are performed to read images on both sides of an original sheet and thereafter analyze the two images and, based on the analysis result, decide the contents of image forming or the side of an original sheet on which to perform overwriting printing, the aforementioned operations result in the original sheet passing through the image forming unit a plurality of times including the time of being passed directly therethrough without stopping when performing the double-sided reading and the time of performing the overwriting printing. Therefore, there is a concern that a problem will arise that the original sheet will be affected as a result of passing through the image forming unit or that the image forming unit will become worn as a result of the original sheet passing therethrough a plurality of times.

SUMMARY OF THE INVENTION

The present invention has been made in view of the above described circumstances, and enables the performance of overwriting printing on an original sheet while reducing the influence on the original sheet and an image forming unit.

A purpose of the invention is to provide an image forming apparatus including an image forming unit that performs image formation on a recording material, a reading unit that reads an original sheet, a first original sheet conveyance path in which an original sheet fed from a feeding unit in which original sheets are stacked is conveyed, a second original sheet conveyance path in which the original sheet whose first and second sides are read by the reading unit is conveyed to a discharging unit that stacks discharged original sheets, a common conveyance path in which a recording material or the original sheet is conveyed so that image formation is performed on a second side of the recording material in which image formation is performed on a first side by the image forming unit, or the first side of the original sheet conveyed from the first original sheet conveyance path is read by the reading unit, a third original sheet conveyance path for conveying the original sheet conveyed in the second original sheet conveyance path to the common conveyance path, the third original sheet conveyance path connecting the first original sheet conveyance path and the second original sheet conveyance path, and a control unit that controls to convey the original sheet conveyed in the second original sheet conveyance path to the common conveyance path through the third original sheet conveyance path, and perform image formation on the original sheet by the image forming unit.

Further features of the present invention will become apparent from the following description of exemplary embodiments with reference to the accompanied drawings.

DESCRIPTION OF THE EMBODIMENTS

Preferred embodiments of the present invention will now be described in detail in accordance with the accompanying drawings.

Modes for carrying out the present invention will be described in detail below by way of exemplary embodiments with reference to the attached drawings.

Embodiment 1

Figure 1:
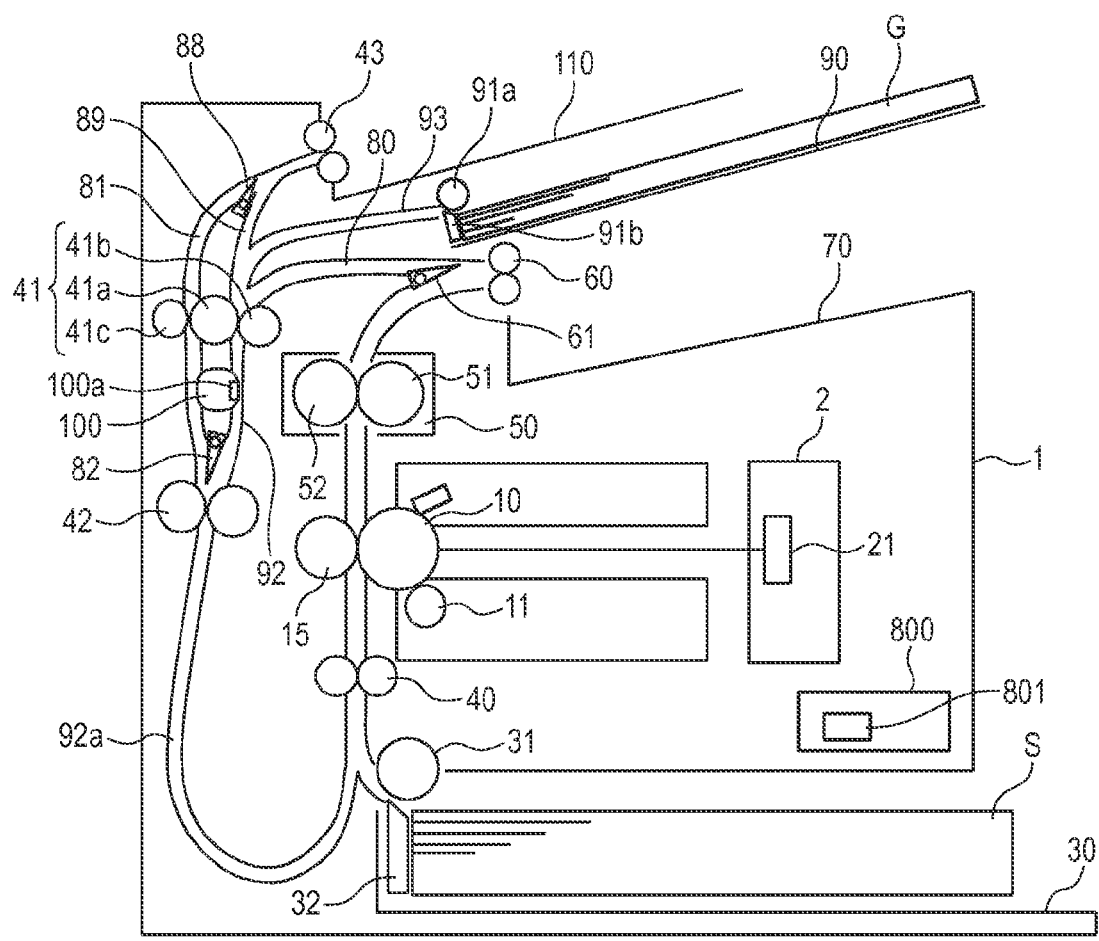
FIG. 1 is a schematic sectional view of an image forming apparatus with an image reading apparatus according to Embodiment 1.

FIG. 1 illustrates a schematic cross-sectional configuration of an image forming apparatus with an image reading apparatus according to Embodiment 1. In the present embodiment, an image forming apparatus that includes an image scanner having an automatic document feeder provided on a color laser-beam printer that employs an electrophotographic system is described as the image forming apparatus with an image reading apparatus. However, the present invention is not limited to the apparatus illustrated in FIG. 1, and can also be broadly applied to image forming apparatuses with an image reading apparatus that employ another system.

(Image Forming Process)

An image forming process for forming an image on a recording sheet S will now be described referring to FIG. 1 and FIG. 2A to FIG. 2D. In these drawings, the recording sheet S that is conveyed inside the image forming apparatus 1 is represented by a thick solid line, and a conveying direction of the recording sheet S is indicated by the orientation of an arrow of the thick solid line. The same also applies with respect to an original sheet G in FIG. 3A to FIG. 3D that are described later. Further, like components in the drawings are denoted by like reference numerals, and a duplicated description is omitted with respect to components that have already been described.

FIG. 1 is a sectional view of an image forming apparatus with an image reading apparatus (hereunder, referred to as "image forming apparatus 1") of the present embodiment. An image forming unit of the image forming apparatus 1 forms a toner image by a known electrophotographic image forming process. A rotatable photosensitive drum 10 serving as an image bearing member, and a developing roller 11 that is disposed in parallel contact with the photosensitive drum 10 and rotates while retaining toner thereon are arranged in the image forming unit. When the image forming apparatus 1 receives a print signal from an external device such as a computer, a light emitting unit 21 of an optical unit 2 irradiates an electrostatically charged surface of the photosensitive drum 10 with laser light, to thereby form a latent image by a charge on the surface of rotating photosensitive drum 10. When toner is supplied to the latent image on the surface of the photosensitive drum 10 while the developing roller 11 is rotating, a toner image is formed on the surface of the photosensitive drum 10.

The image forming apparatus 1 includes a control unit 800 having a CPU 801 that is a control unit. The CPU 801 of the control unit 800 controls the above described image forming operations performed by the image forming unit, as well as operations to convey the recording sheet S and the original sheet G described below. A configuration may also be adopted in which the control unit 800 includes an ASIC, with the ASIC being configured to perform control of a driving system such as, for example, a motor and a solenoid, that drives a conveyance roller and the like that convey the recording sheet S and the original sheet G. The control unit 800 includes a memory (not shown) that stores a program and data for executing processing that the CPU 801 performs, and a timer (not shown) that manages the time in order to control the conveyance timing of the recording sheet S or the original sheet G. The CPU 801 also controls an operation to read the original sheet G, an image forming operation to form an image on the recording sheet S, and an overwriting printing operation with respect to the original sheet G that is described later in a case where an instruction is received from an external device or a case where an instruction is received from an operating unit (not shown) of the image forming apparatus 1 when a user performs an operation thereon.

Figure 2A:
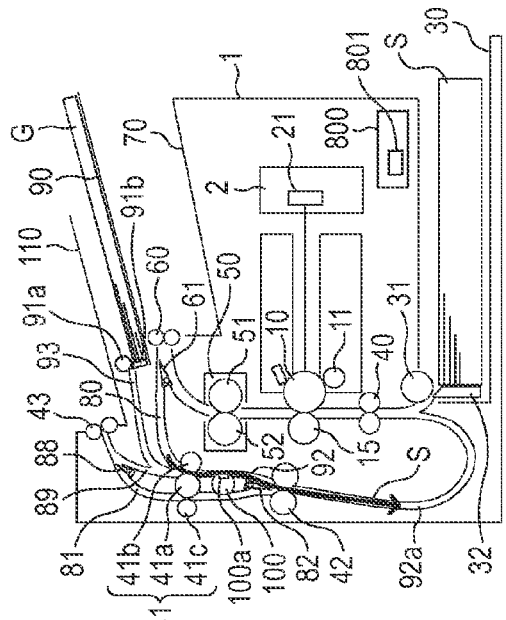
FIGS. 2A, 2B, 2C and 2D are views for describing operations relating to conveying a recording sheet in the image forming apparatus with an image reading apparatus according to Embodiment 1.
Figure 2B:
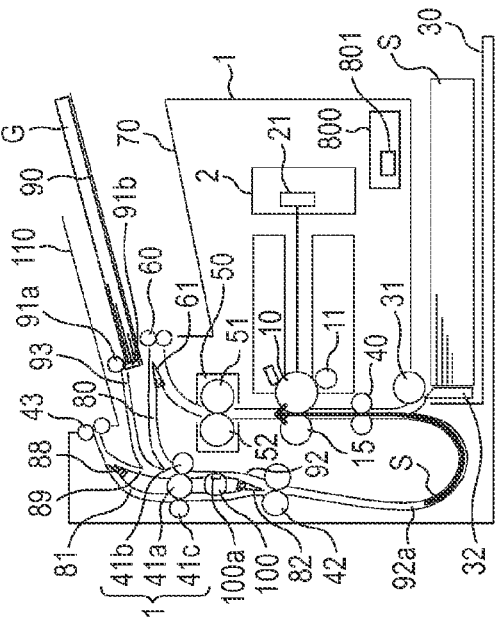

As illustrated in FIG. 2A, recording sheets S stored in a first feeding unit 30 are conveyed one by one toward conveyance rollers 40 by a pick-up roller 31 and a separation member 32. The conveyance rollers 40 convey the relevant recording sheet S to a transfer unit 15 so as to match the timing of the toner image on the surface of the photosensitive drum 10 with the timing of a leading edge position of the recording sheet S. The toner image that is conveyed to the transfer unit 15 by rotation of the photosensitive drum 10 is transferred onto the recording sheet S by a voltage and pressure that is applied to the transfer unit 15. The recording sheet S is then conveyed to a fixing unit 50. At the fixing unit 50, the toner image is fixed onto the recording sheet S by heat from a heating roller 51 and pressure from a rotatable pressure roller 52 that faces the heating roller 51. The recording sheet S having the toner image fixed thereon is conveyed to sheet-discharging rollers 60.

Figure 2C:
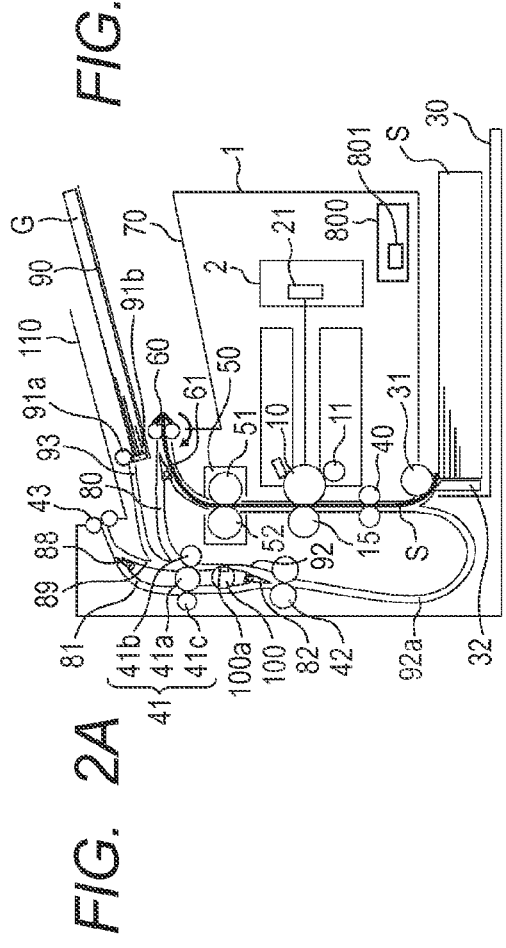

In the case of single-sided printing, the sheet-discharging rollers 60 directly convey the recording sheet S to outside of the image forming apparatus 1, and the recording sheet S is discharged to a first discharging unit 70 to thereby end the image forming process for single-sided printing. Note that the sheet-discharging rollers 60 rotate in the clockwise direction (arrow direction in FIG. 2A) to discharge the recording sheet S to the first discharging unit 70. In the case of double-sided printing, after an image is printed on the first side of the recording sheet S, the recording sheet S is conveyed to the sheet-discharging rollers 60 and a trailing edge of the recording sheet S passes through a flapper 61. When the trailing edge of the recording sheet S passes through the flapper 61, the position (a guide direction) of the flapper 61 is switched by an actuator (not shown, but for example, a solenoid), and the sheet-discharging rollers 60 are rotated in reverse by a driving system as a switching unit not shown in figures. Thus, the sheet-discharging rollers 60 are configured as rollers that are capable of forward rotation (rotation in the clockwise direction) and reverse rotation (rotation in the counter-clockwise direction (the arrow direction in FIG. 2B)). The recording sheet S that was switched back in the reverse direction as a result of the sheet-discharging rollers 60 rotating in the counter-clockwise direction as shown in FIG. 2C is guided to a double-side-print conveyance path 80 by the flapper 61. After the trailing edge of the switched-back recording sheet S passes through the flapper 61, the flapper 61 is switched again to the position (a guide direction) illustrated in FIG. 2A by an actuator (not shown) to be in position (a guide direction) to guide the recording sheet S to the sheet-discharging rollers 60 after an image is fixed thereon.

Figure 2D:
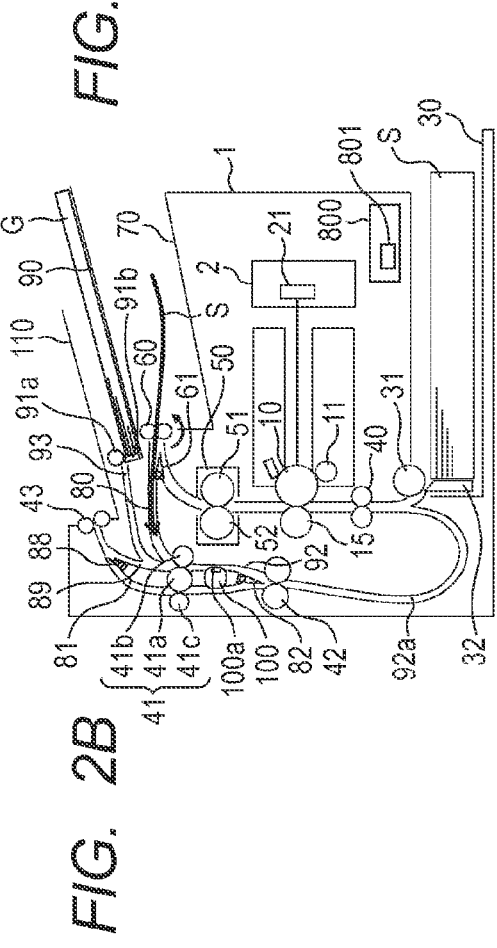

Thereafter, as shown in FIG. 2C, the recording sheet S is conveyed in a common conveyance path 92 by first double-side-print conveyance rollers 41 and second double-side-print conveyance rollers 42 to be conveyed to a U-turn unit 92a. The recording sheet S that passes through the U-turn unit 92a is conveyed again to the transfer unit 15 by the conveyance rollers 40 as shown in FIG. 2D, and after a toner image is transferred and fixed onto a second side thereof, the recording sheet S is discharged to and stacked on the first discharging unit 70 by the sheet-discharging rollers 60.

(Original-Sheet Reading Process)

Figure 3A:
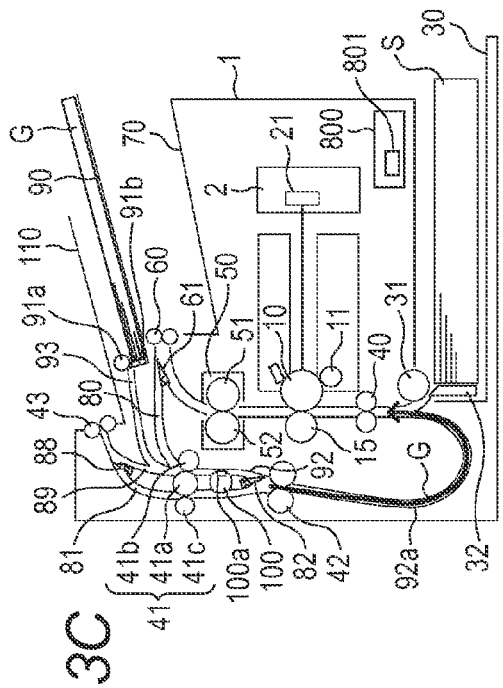
FIGS. 3A, 3B, 3C and 3D are views for describing operations relating to conveying an original sheet in the image forming apparatus with an image reading apparatus according to Embodiment 1.

An image reading process for reading an image of the original sheet G will now be described using FIG. 3A to FIG. 3D. As shown in FIG. 3A, original sheets G contained in a second feeding unit 90 are fed one by one by a pick-up roller 91a and a separation member 91b. Each original sheet G that is fed passes through an original-sheet-feeding conveyance path 93 as a first original sheet conveyance path and is conveyed to the common conveyance path 92. The original sheet G is conveyed to an image reading unit 100 arranged in the common conveyance path 92 by the first double-side-print conveyance rollers 41. A reading cover 100a constituted by a transparent member made of glass or the like is provided in the image reading unit 100. An image of the original sheet G that passes opposite the reading cover 100a is read by a sensor (not shown) provided in the image reading unit 100. For example, the image reading unit 100 includes a light emitting unit that irradiates light onto the original sheet G, and a light receiving unit that receives light reflected by the original sheet G that was irradiated from the light emitting unit. For example, an LED is used as the light emitting unit, and a CIS sensor, a CMOS sensor, or a CCD sensor is used, for example, as the light receiving unit.

Information that was read with the image reading unit 100 is stored in a memory (not shown) of the control unit 800 as image information of the first side of the original sheet G. After passing through the image reading unit 100, as shown in FIG. 3B, the original sheet G passes through a flapper 82 as a third switching unit and is conveyed to the U-turn unit 92a as a fourth original sheet conveyance path. At this time, the second double-side-print conveyance rollers 42 as a third conveyance unit rotate in the clockwise direction (arrow direction in FIG. 3B).

Figure 3C:
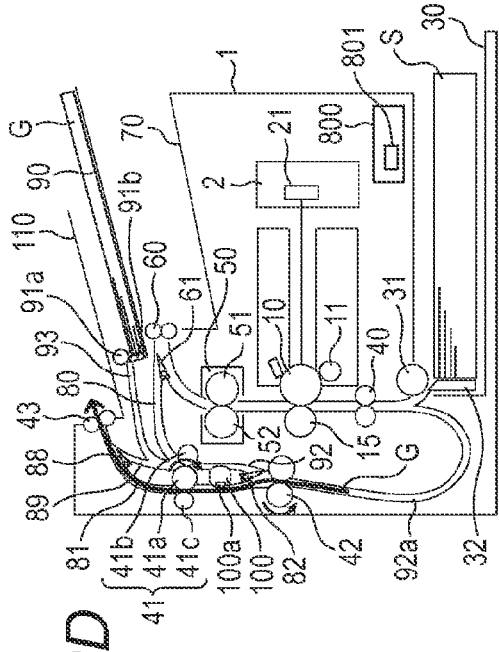
Figure 3B:
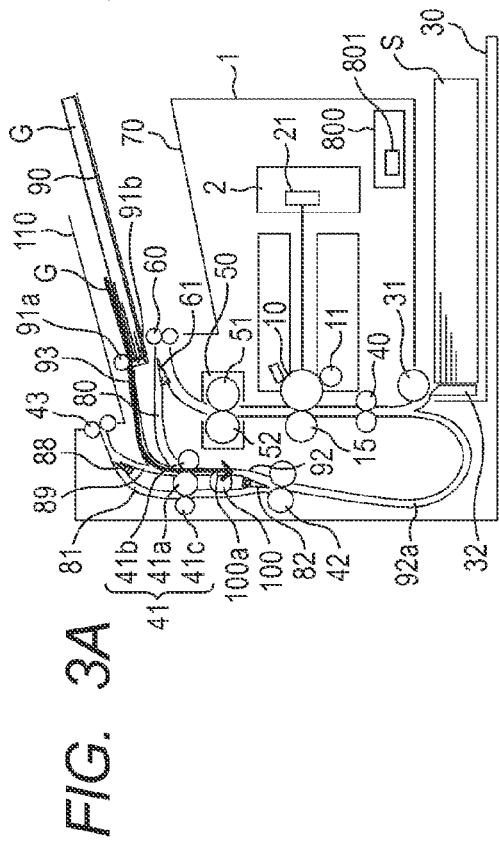

FIG. 3C illustrates the position of the original sheet G after reading of the first side of the original sheet G is completed and immediately prior to entering a process in which the conveying direction of the original sheet G is switched and the second side thereof is read. When the trailing edge of the original sheet G passes through the leading edge of the flapper 82 and is conveyed as far as a predetermined position (a guide direction) that is based on positional information generated by an detection unit not shown in figures, the flapper 82 is switched to the position (directed to a guide direction) shown in FIG. 3C by an actuator (not shown). In this case, the detection unit is, for example, a sensor provided in the conveyance path, and may be a sensor that can detect that the leading edge of the original sheet G arrived at the position of the sensor or that the trailing edge of the original sheet G passed by the position of the sensor. The CPU 801 controls a timing at which the position (a guide direction) of the flapper 82 is switched based on a timing at which the leading edge or trailing edge of the original sheet G is detected by the detection unit as well as on the basis of a known distance between the original-sheet-position (a guide direction) detection unit and the flapper 82 and a known conveyance speed of the original sheet G. The detection unit may be provided on an upstream side of the flapper 82 in the conveying direction of the original sheet G or may be provided on a downstream side thereof. By causing the second double-side-print conveyance rollers 42 to rotate in reverse by a switching unit (not shown) in a state in which the position (a guide direction) of the flapper 82 has been switched, the second double-side-print conveyance rollers 42 switch back the original sheet G and convey the original sheet G towards an original-sheet discharging conveyance path 81 as a second original sheet conveyance path. Note that a configuration may also be adopted in which the flapper 82 is urged in the counter-clockwise direction, and the original sheet G that is conveyed in the common conveyance path 92 from the upper part to the lower part thereof in FIG. 3B pushes open the flapper 82.

Figure 3D:
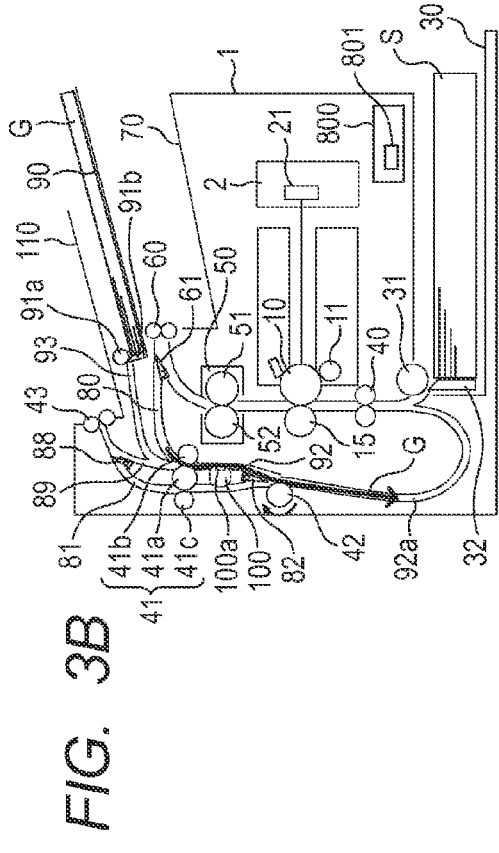

FIG. 3D is a view that illustrates a state in which reading of the second side is performed after the original sheet G is switched back by causing the second double-side-print conveyance rollers 42 to rotate in reverse (rotate in the counter-clockwise direction (arrow direction in FIG. 3D)). The image reading unit 100 that acquired image information of the first side of the original sheet G rotates approximately 180 degrees around a rotary shaft not shown in figures, and thus the reading cover 100a side moves to a position facing the original-sheet discharging conveyance path 81. The image reading unit 100 that moved in this manner acquires image information of the second side of the original sheet G accompanying an operation in which the original sheet G is conveyed in the original-sheet discharging conveyance path 81. The information of the second side of the original sheet G acquired by the image reading unit 100 is stored in a memory (not shown) of the control unit 800. On the downstream side of the image reading unit 100, the original sheet G is conveyed by the first double-side-print conveyance rollers 41.

In this case, the first double-side-print conveyance rollers 41 are configured as three consecutive rollers in which a roller 41b and a roller 41c sandwich a driving roller 41a with a predetermined pressure from both sides. The driving roller 41a of the first double-side-print conveyance rollers 41 rotates in the clockwise direction (arrow direction in FIG. 3D). At the first double-side-print conveyance rollers 41, the recording sheet S or the original sheet G that passes in the common conveyance path 92 can be pinched and conveyed between the driving roller 41a and the roller 41b and thereby conveyed in the direction from the upper side to the lower side as shown in FIG. 3A. Further, at the first double-side-print conveyance rollers 41, the original sheet G that passes in the original-sheet discharging conveyance path 81 can be pinched and conveyed between the driving roller 41a and the roller 41c and thereby conveyed in the direction from the lower side to the upper side as shown in FIG. 3D.

A flapper 88 that is urged in the counter-clockwise direction in FIG. 3D is provided on the downstream side of the original-sheet discharging conveyance path 81. The original sheet G conveyed by the driving roller 41a and the roller 41c of the first double-side-print conveyance rollers 41 pushes open the flapper 88 and is discharged to and stacked on a second discharging unit 110 by original-sheet discharging rollers 43 that are arranged further on the downstream side. After double-sided reading of the original sheet G ends, to prepare for reading of the next original sheet, the image reading unit 100 is moved again to the position at which the reading cover 100a side faces the common conveyance path 92. Note that a configuration can also be adopted in which, when the user selects single-sided reading, control is performed so as not to move the image reading unit 100.

In a case where the user selects a copy mode, based on information stored in a memory (not shown) of the control unit 800, the light emitting unit 21 irradiates laser light onto the photosensitive drum 10, and the image forming apparatus 1 executes an image forming process to form an image on the recording sheet S. Note that if the user does not select the copy mode, an operation that is performed is not limited to an image forming process, and it is also possible to, for example, send information obtained by reading the original sheet G and stored in the memory (not shown) of the control unit 800 to a computer as electronic data.

(Other Example of Original-Sheet Reading Process)

Figure 4A:
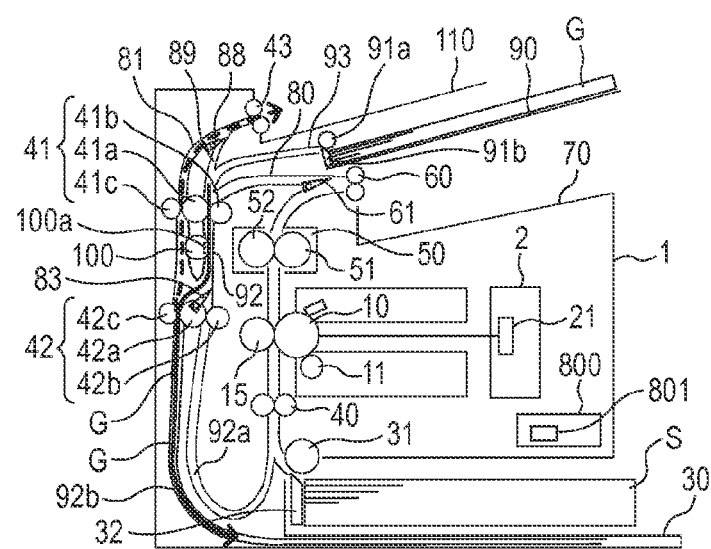
FIGS. 4A, 4B and 4C are views for describing operations relating to conveying an original sheet in the image forming apparatus with an image reading apparatus according to Embodiment 1.
Figure 4B:
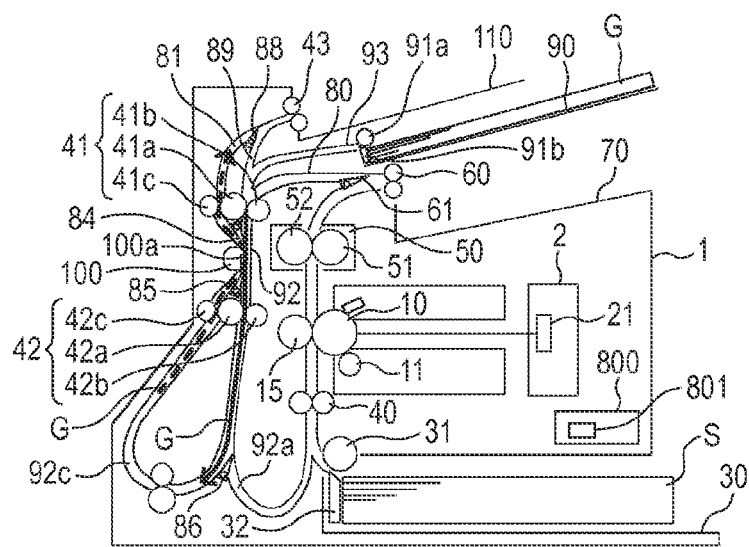
Figure 4C:
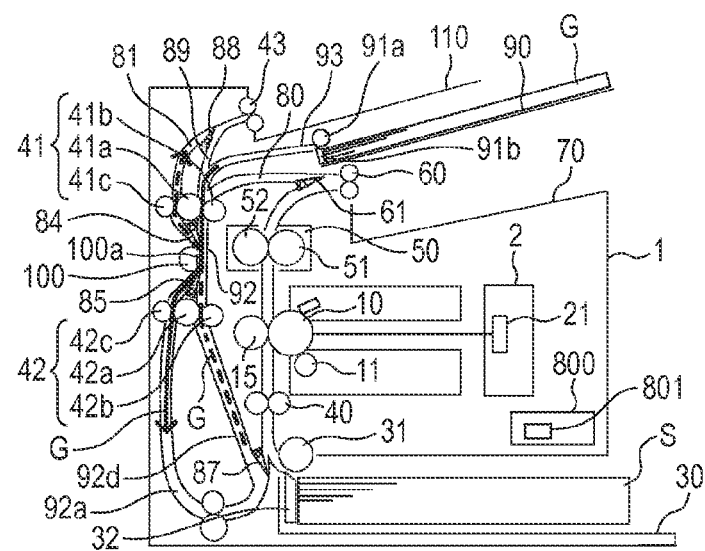

In addition to the configuration illustrated in FIG. 3A to FIG. 3D, a configuration illustrated in FIG. 4A to FIG. 4C can also be adopted as conveyance paths for reading both sides of an original sheet.

(Configuration Illustrated in FIG. 4A)

The configuration illustrated in FIG. 4A includes an original-sheet-reversing conveyance path 92b as a fourth original sheet conveyance path that is provided separately to the U-turn unit 92a, and is adapted so that, when conveying the original sheet G, switching is performed by a flapper 83 so that the original sheet G passes in the original-sheet-reversing conveyance path 92b. The second double-side-print conveyance rollers 42 are configured as three consecutive rollers similarly to the first double-side-print conveyance rollers 41. That is, the second double-side-print conveyance rollers 42 illustrated in FIG. 4A are configured as three consecutive rollers in which a roller 42b and a roller 42c sandwich a driving roller 42a with a predetermined pressure from both sides. The second double-side-print conveyance rollers 42 convey the recording sheet S that passes in the u-turn unit 92a by the driving roller 42a and the roller 42b. The second double-side-print conveyance rollers 42 also convey the original sheet G that passes in the original-sheet-reversing conveyance path 92b by the driving roller 42a and the roller 42c. After the first side of the original sheet G is read by the image reading unit 100, the original sheet G is conveyed to the side of the roller 42c of the second double-side-print conveyance rollers 42 by the flapper 83. At such time, by causing the driving roller 42a to rotate in reverse (rotate in the counter-clockwise direction), the original sheet G is conveyed in the original-sheet-reversing conveyance path 92b, as illustrated by a thick solid line in FIG. 4A.

The original sheet G passes in the original-sheet-reversing conveyance path 92b that is located on the outer side of the U-turn unit 92a and is conveyed to the lower surface side of the image forming apparatus 1. When the trailing edge of the original sheet G passes the leading edge of the flapper 83 and is conveyed to a predetermined position (direction) based on positional information obtained by an detection unit, the flapper 83 is switched by an actuator (not shown) to a position (a guide direction) such that the flapper 83 guides the original sheet G to the original-sheet discharging conveyance path 81 side. Further, by switching the driving roller 42a so as to perform forward rotation (rotation in the clockwise direction) by a switching unit (not shown), the original sheet G is conveyed to the original-sheet discharging conveyance path 81, as illustrated by a thick broken line in FIG. 4A. Subsequently, after reading the second side of the original sheet G by moving the image reading unit 100 to a position such that the reading cover 100a faces the original-sheet discharging conveyance path 81, the original sheet G is discharged to the second discharging unit 110.

(Configuration Illustrated in FIG. 4B)

According to the configuration illustrated in FIG. 4B, the common conveyance path 92 is provided with an original-sheet U-turn conveyance path 92c as a fourth original sheet conveyance path that branches from a position partway in the U-turn unit 92a and merges again with the common conveyance path 92 after making a U-turn in the opposite direction to the U-turn unit 92a. In other words, the original-sheet U-turn conveyance path 92c is a conveyance path that branches from the U-turn unit 92a and merges with the common conveyance path 92 at a position that, relative to the position at which the image reading unit 100 is provided, is on an upstream side in the conveying direction (indicated by a broken line in FIG. 4B) of the original sheet G whose second side is to be read. The second double-side-print conveyance rollers 42 are configured as three consecutive rollers, similarly to the configuration illustrated in FIG. 4A. The original sheet G that is conveyed by the first double-side-print conveyance rollers 41 pushes open a flapper 84 urged in the counter-clockwise direction in FIG. 4B, and is conveyed to the image reading unit 100 where the first side of the original sheet G is read. After the first side thereof is read by the image reading unit 100, the original sheet G is conveyed to the U-turn unit 92a by the driving roller 42a and the roller 42b of the second double-side-print conveyance rollers 42. At such time, a flapper 85 is being urged in the counter-clockwise direction in FIG. 4B, and is positioned in a direction for guiding the original sheet G to the roller 42b side. The original sheet G is guided to the original-sheet U-turn conveyance path 92c by a flapper 86 whose position (guide direction) is switched by an actuator (not shown) so as to guide the original sheet G to the original-sheet U-turn conveyance path 92c side.

Thereafter, the original sheet G passes in the original-sheet U-turn conveyance path 92c and arrives at the driving roller 42a and the roller 42c of the second double-side-print conveyance rollers 42. The original sheet G pushes open the flapper 85 that is urged in the counter-clockwise direction, and is again conveyed to the image reading unit 100 in the common conveyance path 92 where reading of the second side is performed by the image reading unit 100. At such time, operations to switch back the original sheet G and to rotate the image reading unit 100 are not performed. Thereafter, the original sheet G is guided to the original-sheet discharging conveyance path 81 by the flapper 84 and is discharged to the second discharging unit 110. Thus, in FIG. 4B, during a period from when the original sheet G is fed until the original sheet G is discharged, the conveying direction of the original sheet G is not reversed and the driving roller 42a of the second double-side-print conveyance rollers 42 remains in a state of forward rotation (rotation in the clockwise direction). Note that after the trailing edge of the original sheet G passes through the flapper 86, the flapper 86 is switched by an actuator (not shown) to a position (guide direction) at which the flapper 86 guides the recording sheet S to the image forming unit.

(Configuration Illustrated in FIG. 4C)

In the configuration illustrated in FIG. 4C, the U-turn unit 92a branches from an original-sheet U-turn conveyance path 92d as a fourth original sheet conveyance path immediately prior to (on the upstream side) the conveyance rollers 40. In other words, the original-sheet U-turn conveyance path 92d is a conveyance path that branches from the U-turn unit 92a on the downstream side in the conveying direction of the original sheet G (indicated by a solid line in the drawing) whose first side has been read. Further, the original-sheet U-turn conveyance path 92*d* is a conveyance path that merges with the common conveyance path 92 at a position that, relative to the position at which the image reading unit 100 is provided, is on an upstream side in the conveying direction (indicated by a broken line in FIG. 4B) of the original sheet G whose second side is to be read. The second double-side-print conveyance rollers 42 are configured as three consecutive rollers, similarly to the configuration illustrated in FIG. 4A. The original sheet G that is conveyed by the first double-side-print conveyance rollers 41 pushes open the flapper 84 urged in the counter-clockwise direction in FIG. 4C, and is conveyed to the image reading unit 100 where the first side of the original sheet G is read. After the first side thereof is read by the image reading unit 100, the original sheet G is conveyed by the driving roller 42*a* and the roller 42*c* of the second double-side-print conveyance rollers 42. At such time, the flapper 85 is being urged in the clockwise direction in FIG. 4C, and is positioned in a direction for guiding the original sheet G to the roller 42*c* side. As indicated by a thick solid line in FIG. 4C, the original sheet G that is conveyed in the U-turn unit 92*a* is guided to the original-sheet U-turn conveyance path 92*d* by a flapper 87 that is switched by an actuator (not shown) so as to guide the original sheet G to the original-sheet U-turn conveyance path 92*d* side.

Thereafter, as indicated by a thick broken line in FIG. 4C, the original sheet G passes in the original-sheet U-turn conveyance path 92*d* and arrives at the driving roller 42*a* and the roller 42*b* of the second double-side-print conveyance rollers 42. The original sheet G pushes open the flapper 85 that is urged in the clockwise direction, and is again conveyed to the image reading unit 100 in the common conveyance path 92 where reading of the second side of the original sheet G is performed by the image reading unit 100. At such time, operations to switch back the original sheet G and to rotate the image reading unit 100 are not performed. Thereafter, the original sheet G is guided to the original-sheet discharging conveyance path 81 by the flapper 84 that is urged in the counter-clockwise direction, and is discharged to the second discharging unit 110. Thus, in FIG. 4C, during a period from when the original sheet G is fed until the original sheet G is discharged, the conveying direction of the original sheet G is not reversed and the driving roller 42*a* of the second double-side-print conveyance rollers 42 remains in a state of reverse rotation (rotation in the counter-clockwise direction). Note that after the trailing edge of the original sheet G passes through the flapper 87, the flapper 87 is switched by an actuator (not illustrated in the drawings) to a position (guide direction) at which the flapper 87 guides the recording sheet S to the image forming unit.

(Overwriting Printing Process)

Figure 5A:
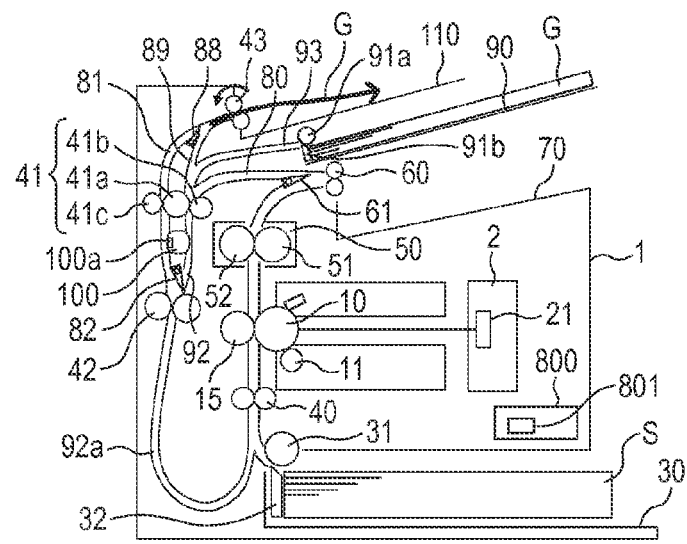
FIGS. 5A, 5B and 5C are views for describing operations relating to conveying an original sheet in the image forming apparatus with an image reading apparatus according to Embodiment 1.
Figure 5B:
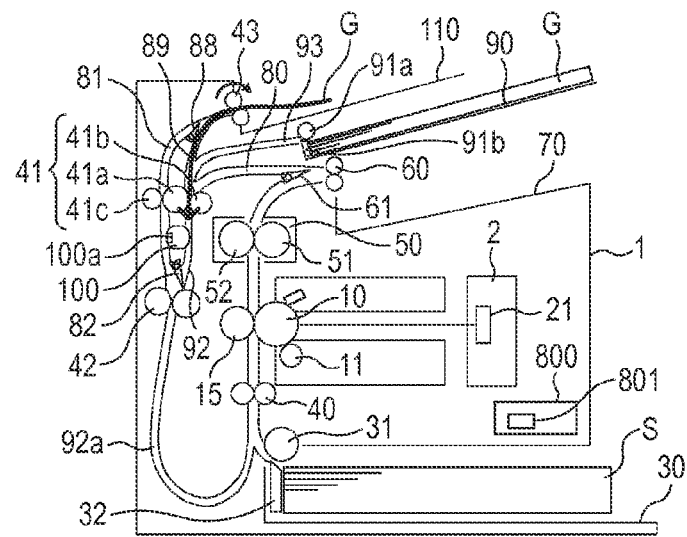

A process for performing printing to overwrite an image onto the original sheet G will now be described using FIG. 5A to FIG. 5C with respect to a case where the conveyance paths for the recording sheet S and the original sheet G in the image forming apparatus 1 are configured as illustrated in FIG. 1. As illustrated in FIG. 1, the image forming apparatus 1 includes a second original-sheet-reversing conveyance path 89 as a third original sheet conveyance path that branches from the original-sheet discharging conveyance path 81 on an upstream side of the original-sheet discharging rollers 43 as a first conveyance unit, and merges with the common conveyance path 92. More specifically, the second original-sheet-reversing conveyance path 89 is configured so that, by connecting the original-sheet discharging conveyance path 81 and the original-sheet-feeding conveyance path 93, the original sheet G is conveyed from the second original-sheet-reversing conveyance path 89 to the common conveyance path 92. Further, the original-sheet discharging rollers 43 are capable of rotating in a predetermined rotational direction, and also capable of rotating in a rotational direction opposite to the predetermined rotational direction by a switching unit not shown in figures. After the state illustrated in FIG. 3D in which reading of the first side and the second side thereof by the image reading unit 100 has ended, the original sheet G is further conveyed to enter a state as illustrated in FIG. 5A in which the trailing edge of the original sheet G has passed through the flapper 88. Since the flapper 88 that was pushed open by the original sheet G is urged in the counter-clockwise direction, the flapper 88 returns to the original position (direction) thereof as illustrated in FIG. 5A. Further, the rotational direction of the original-sheet discharging rollers 43 is switched from the forward rotation direction (rotation in the counter-clockwise direction (arrow direction in FIG. 5A)) to the reverse rotation direction (rotation in the clockwise direction (arrow direction in FIG. 5B)). As a result, as illustrated in FIG. 5B, the conveying direction of the original sheet G changes to the opposite direction, and the original sheet G is guided to the second original-sheet-reversing conveyance path 89 from the original-sheet discharging conveyance path 81 by the flapper 88. The original sheet G is then conveyed again to the common conveyance path 92, that is, the conveyance path for reading an image of the first side of an original sheet. At such time, the image reading unit 100 is left in a position at which the reading cover 100*a* faces the original-sheet discharging conveyance path 81. As a result, when the original sheet G passes in the common conveyance path 92 again, the original sheet G and the reading cover 100*a* of the image reading unit 100 do not come in direct contact, and it is thereby possible to prevent dirtying of the reading cover 100*a* and the like.

Figure 5C:
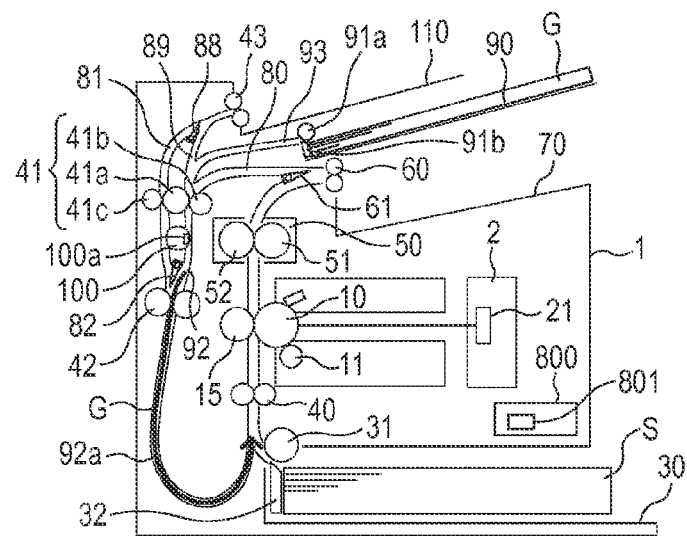

Thereafter, as illustrated in FIG. 5C, the original sheet G is conveyed from the common conveyance path 92 to the image forming unit via the U-turn unit 92*a*. A toner image is formed by the same process as the image forming process described above on the original sheet G conveyed to the image forming unit. At such time, it is possible to overwrite the original sheet G with an image that is based on the information of the original sheet G that was read. The original sheet G is conveyed to the image forming unit after both sides of the original sheet G are read. Therefore, the CPU 801 may determine either one side of the two sides of the original sheet G on which an image is to be overwritten, based on the information of the two sides of the original sheet G stored in the memory (not shown) of the control unit 800. Further, similarly to the above described double-sided printing operations, it is also possible to overwrite an image on both sides of the original sheet G. Note that a predetermined image may be overwritten on an arbitrary side of the original sheet G, irrespective of the image information that was read. Further, an image based on the image information that was read as well as a predetermined image may be overwritten on an arbitrary side of the original sheet G.

Thus, according to the present embodiment, by conveying the original sheet G to the common conveyance path 92 via the second original-sheet-reversing conveyance path 89, a situation does not arise in which the original sheet G is passed directly through the image forming unit without stopping multiple times. Further, the conveying direction of the original sheet G in the common conveyance path 92 and the original-sheet discharging conveyance path 81 can be limited to only one direction. As a result, reverse rotation of conveyance rollers (in this case, only the original-sheet discharging rollers 43) to convey the original sheet G to the image forming unit after reading images on both sides thereof may be kept to a minimum, and a configuration may be adopted in which conveyance in only one direction is taken into consideration with respect to the conveyance path also.

In a case of deciding the image to be overwritten on the original sheet G in accordance with an image obtained by reading the original sheet G by the image reading unit 100 or the like, if time is required for processing the read image, conveyance of the original sheet G may be temporarily stopped before the original sheet G arrives at the image forming unit. In the case of the above described conveyance path configurations that are illustrated in FIG. 4A to FIG. 4C also, by providing a similar path, the original sheet G can be conveyed to the image forming unit after reading both sides thereof. That is, as illustrated in FIG. 4A to FIG. 4C, a configuration may be adopted that includes the second original-sheet-reversing conveyance path 89, the flapper 88 that switches between the original-sheet discharging conveyance path 81 and the second original-sheet-reversing conveyance path 89, and the original-sheet discharging rollers 43 that are capable of forward rotation and reverse rotation.

In the case of reading only a single side of the original sheet G and performing overwriting printing on that side, the original sheet G may be conveyed to the image forming unit without being switched back form the state illustrated in FIG. 3C. It is thereby possible to form an image on a first side of the original sheet G that was read, and time that would be required for reading images on both sides can be saved. According to the present embodiment, a distance from the image reading unit 100 to the conveyance rollers 40 is set so that, when reading of the image on the first side of the original sheet G is completed, the leading edge of the original sheet G is positioned upstream of the conveyance rollers 40 as shown in FIG. 3C. Consequently, in a case where time is required to process the image that was read, it is possible to temporarily stop conveying of the original sheet G in the state illustrated in FIG. 3C, and thereafter resume conveying of the original sheet G to the image forming unit.

Note that, as the setting with respect to the length of a conveyance path for temporarily stopping the original sheet G between the image reading unit 100 and the image forming unit in this manner, a length may be set that is longer than a length in a conveying direction of a maximum size original sheet that can be processed in the apparatus. Depending on the configuration or the control method of the apparatus, the aforementioned length may be set as a distance from, apart from the image reading unit 100, for example, the leading edge of the flapper 82 as the starting point with respect to the trailing edge side of the original sheet to, with respect to the leading edge side of the original, apart from the conveyance rollers 40, for example, a merging point at which the U-turn unit 92a merges with the image formation conveyance path, or the position of the transfer unit 15 or a detection unit (not shown) for detecting the leading edge of the original sheet.

Figure 8A:
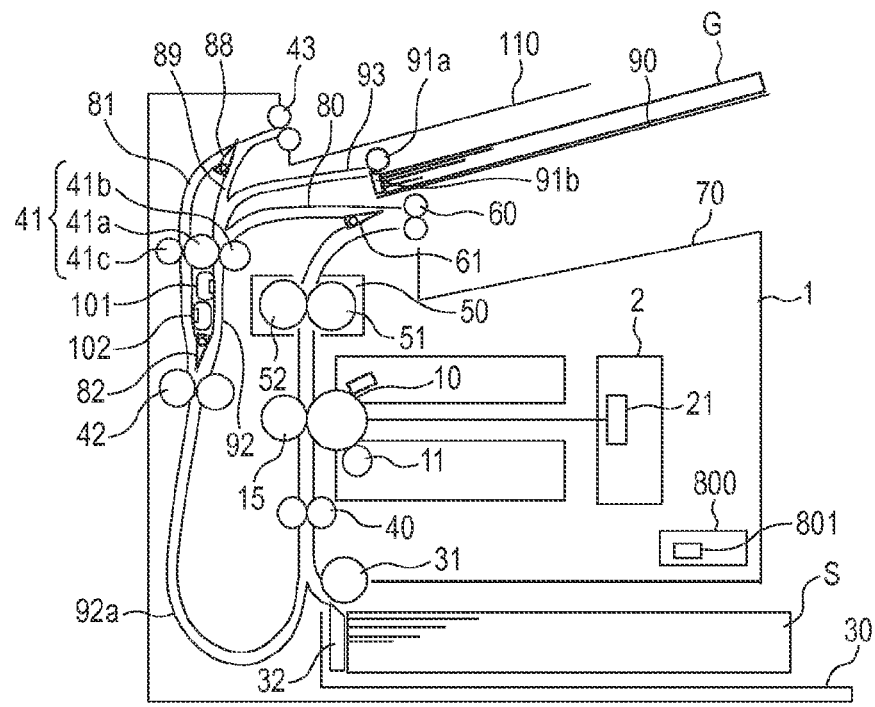
FIGS. 8A and 8B are views of the image forming apparatus with an image reading apparatus of Embodiment 1, illustrating an example of the arrangement of the image reading apparatus and well as respective operations thereof.
Figure 8B:
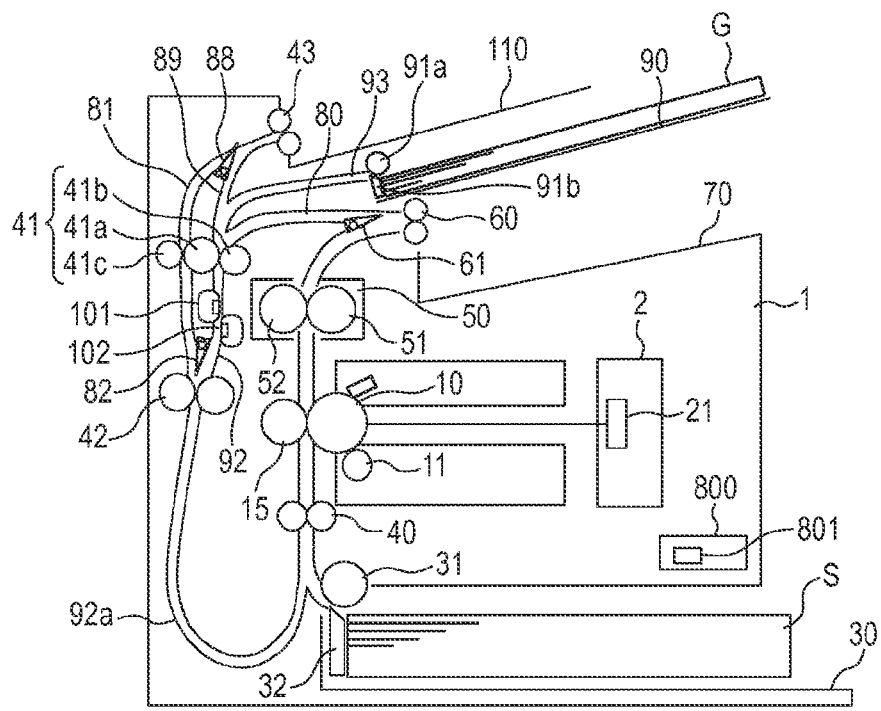

In addition, although according to the present embodiment a configuration has been described in which both sides of the original sheet G are read by the single image reading unit 100, both sides of the original sheet G may be read using two image reading units. For example, a configuration may be adopted in which, as illustrated in FIG. 8A, both sides of the original sheet G are read by a first image reading unit 101 that reads the original sheet G that passes in the common conveyance path 92 and a second image reading unit 102 that reads the original sheet G that passes in the original-sheet discharging conveyance path 81 side. Further, as illustrated in FIG. 8B, a configuration may be adopted in which the first image reading unit 101 and the second image reading unit 102 are arranged on the two sides of the common conveyance path 92 to thereby read both sides of the original sheet G.

According to the present embodiment described above, overwriting printing can be performed on an original sheet while reducing the influence on the original sheet and the image forming unit.

Embodiment 2

Figure 6A:
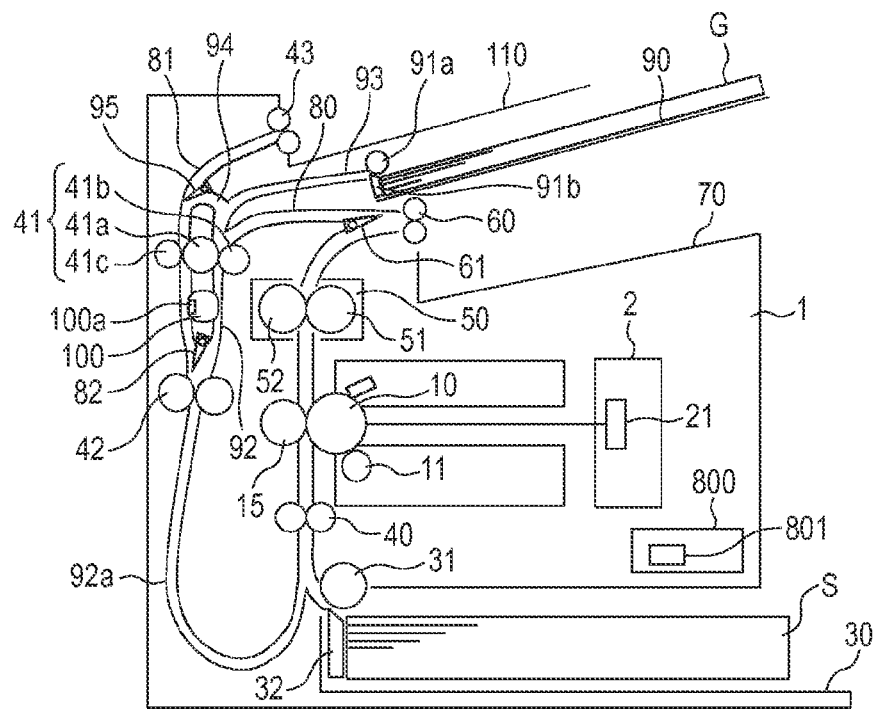
FIG. 6A is a schematic sectional view of an image forming apparatus with an image reading apparatus according to Embodiment 2.
Figure 6B:
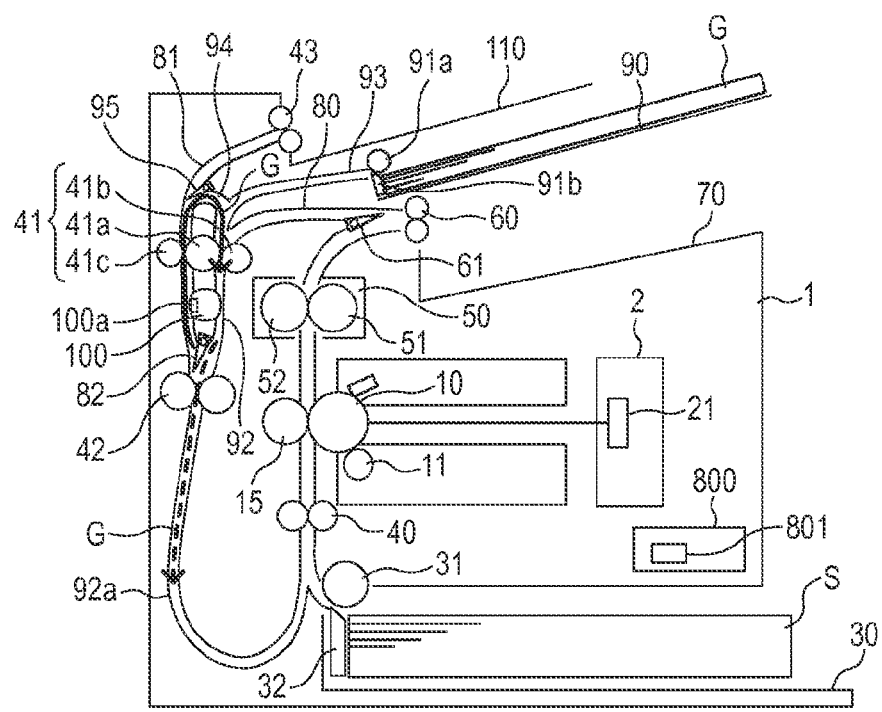
FIG. 6B is a view for describing operations relating to conveying an original sheet in the image forming apparatus with an image reading apparatus according to Embodiment 2.

Embodiment 2 will now be described with reference to FIG. 6A and FIG. 6B. Note that components that are the same as components described in Embodiment 1 are denoted by the same reference numerals, and a description of such components is omitted. FIG. 6A is a sectional view of an image forming apparatus with an image reading apparatus according to the present embodiment. FIG. 6B illustrates an operation to convey an original sheet according to the present embodiment. In the present embodiment, a second U-turn conveyance path 94 is provided as a third original sheet conveyance path that branches from the original-sheet discharging conveyance path 81 at a position above the first double-side-print conveyance rollers 41, that is, on a downstream side in the conveying direction of the first double-side-print conveyance rollers 41, and thereafter merges with the common conveyance path 92. More specifically, the second U-turn conveyance path 94 is configured so that, by connecting the original-sheet discharging conveyance path 81 and the original-sheet-feeding conveyance path 93, the original sheet G is conveyed from the second U-turn conveyance path 94 to the common conveyance path 92. In the present embodiment, as illustrated in FIG. 6B, while the second side thereof is being read by the image reading unit 100 in the original-sheet discharging conveyance path 81, the path of the original sheet G is switched by a flapper 95 as a first switching unit whose position (guide direction) is switched by an actuator not shown in figures. As illustrated by a thick solid line in FIG. 6B, the original sheet G is then conveyed from the leading edge thereof through the second U-turn conveyance path 94 to the common conveyance path 92. That is, according to the present embodiment, the original sheet G is conveyed to the common conveyance path 92 without being conveyed to the original-sheet discharging rollers 43 and performing a switch back operation in which the conveying direction is reversed. Thereafter, as illustrated by a thick broken line in FIG. 6B, the original sheet G is conveyed to the image forming unit via the U-turn unit 92a, and the overwriting printing process described in Embodiment 1 is performed thereon.

In this case, a configuration is adopted so that the conveying distance from the position at which reading of the second side of the original sheet G is performed to the image forming unit is set so as to be longer than the length of the original sheet G, and so that the original sheet G arrives at the image forming unit after reading of both sides thereof is completed.

Thus, according to the configuration of the present embodiment also, similarly to Embodiment 1, after both sides of the original sheet G are read, it is possible to guide the original sheet G again to the conveyance path on which the first side was read to send the original sheet G to the image forming unit and perform overwriting printing on the original sheet G. Note that the respective conveyance path configurations illustrated in FIG. 4A to FIG. 4C that are described above can also be applied to the present embodiment as conveyance paths for reading both sides of the original sheet.

Thus, according to the present embodiment, overwriting printing can be performed on an original sheet while reducing the influence on the original sheet and the image forming unit.

Embodiment 3

Figure 7A:
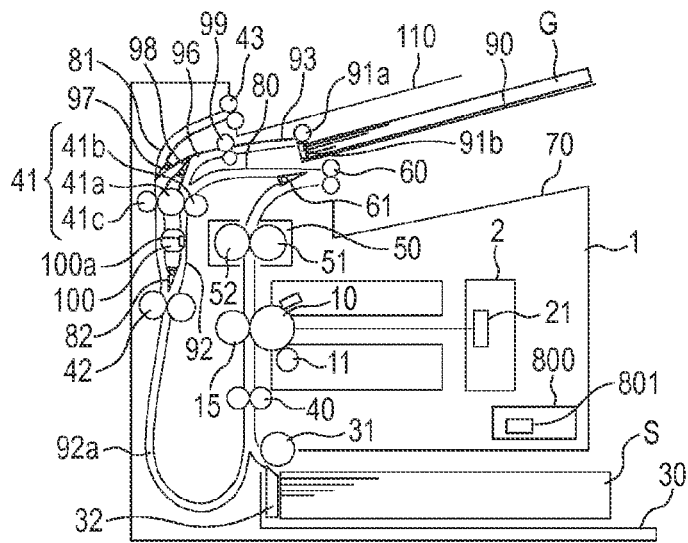
FIG. 7A is a schematic sectional view of an image forming apparatus with an image reading apparatus according to Embodiment 3.
Figure 7B:
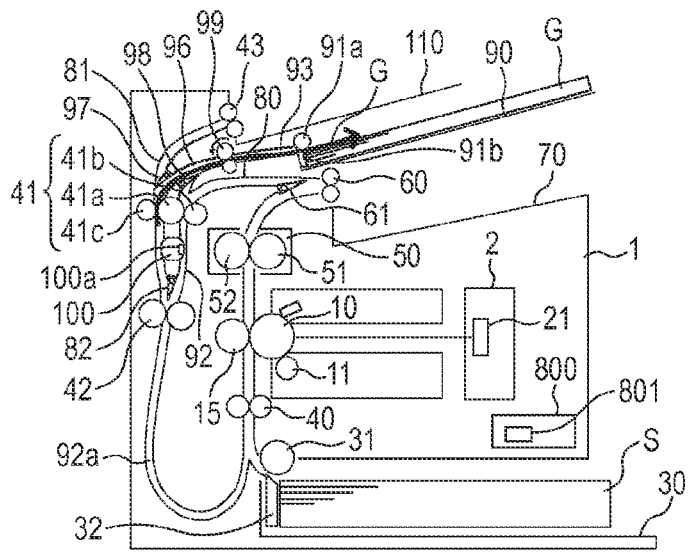
FIGS. 7B and 7C are a view for describing operations relating to conveying an original sheet in the image forming apparatus with an image reading apparatus according to Embodiment 3.

Embodiment 3 will now be described with reference to FIG. 7A to FIG. 7C. Note that components that are the same as components described in Embodiments 1 and 2 are denoted by the same reference numerals, and a description of such components is omitted. FIG. 7A is a sectional view of an image forming apparatus with an image reading apparatus according to the present embodiment. FIG. 7B illustrates an operation to convey an original sheet according to the present embodiment. In the present embodiment, a third original-sheet-reversing conveyance path 96 as a third original sheet conveyance path is provided that branches from the original-sheet discharging conveyance path 81 at a position above the first double-side-print conveyance rollers 41, that is, on a downstream side in the conveying direction of the first double-side-print conveyance rollers 41, and thereafter merges with the original-sheet-feeding conveyance path 93. Further, a flapper 97 as a second switching unit is provided at a branching portion between the original-sheet discharging conveyance path 81 and the third original-sheet-reversing conveyance path 96, and a flapper 98 that is urged in the counter-clockwise direction in FIG. 7A is provided at a merging point between the third original-sheet-reversing conveyance path 96 and the original-sheet-feeding conveyance path 93. Reversing rollers 99 as a second conveyance unit capable of forward rotation and reverse rotation are provided in the original-sheet-feeding conveyance path 93. Further, a pick-up roller 91a and/or a separation member 91b as a pair of feeding units are configured to be capable of separating from each other by means an actuator not shown in figures.

As shown in FIG. 7B, after the second side of the original sheet G is read by the image reading unit 100, the original sheet G is conveyed to the third original-sheet-reversing conveyance path 96 side by the flapper 97 whose position (guide direction) was switched by an actuator not shown in figures. The original sheet G then pushes open the flapper 98 that is urged in the counter-clockwise direction in FIG. 7B, and is conveyed in the reverse direction in the original-sheet-feeding conveyance path 93 by the reversing rollers 99. At this time, the reversing rollers 99 are rotating in the counter-clockwise direction (arrow direction in FIG. 7B). Further, by causing the pick-up roller 91a to separate from the separation member 91b in advance, the leading edge of the original sheet G is conveyed onto the second feeding unit 90.

Figure 7C:
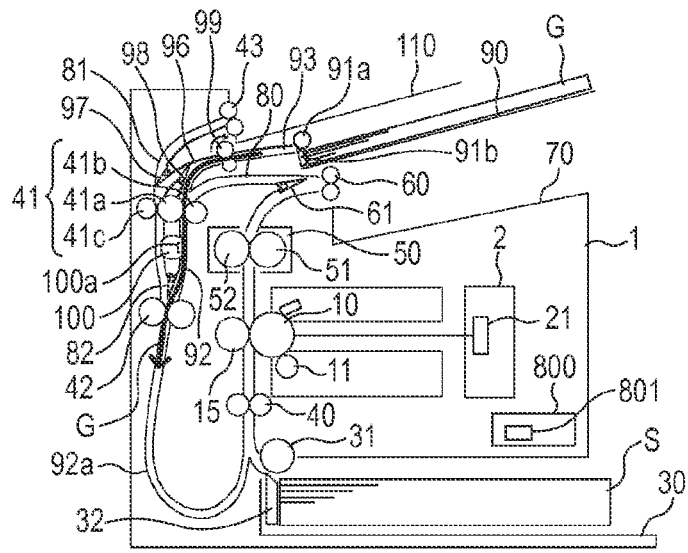

When the trailing edge of the original sheet G passes through the flapper 98, as illustrated in FIG. 7C, the flapper 98 returns to the original position (direction) thereof (position illustrated in FIG. 7A) by an urging force in the counter-clockwise direction. Further, by causing the reversing rollers 99 to perform a reverse rotation (rotation in the clockwise direction (arrow direction in FIG. 7C), the original sheet G is guided to the common conveyance path 92 by the flapper 98. The original sheet G is then conveyed to the image forming unit via the U-turn unit 92a, and the overwriting printing process described in Embodiment 1 is performed thereon.

According to the configuration of the present embodiment also, similarly to Embodiment 1, after both sides of the original sheet G are read, it is possible to guide the original sheet G again to the common conveyance path 92 that is the conveyance path on which the first side was read, and thereby convey the original sheet G to the image forming unit and perform overwriting printing on the original sheet G. Note that the respective conveyance path configurations illustrated in FIG. 4A to FIG. 4C described above can also be applied to the present embodiment as conveyance paths for reading both sides of the original sheet G.

Thus, according to the present embodiment, overwriting printing can be performed on an original sheet while reducing the influence on the original sheet and the image forming unit.

Other Embodiments

Although in the foregoing embodiments a configuration is adopted in which, for example, the flapper 88 is urged in the counter-clockwise direction, a configuration may also be adopted in which the position (guide direction) of the flapper 88 is switched by an actuator not shown in figures. Thus, in Embodiments 1 to 3, a configuration may be adopted in which the position (guide direction) of a flapper urged in the clockwise direction or the counter-clockwise direction in the above described embodiments is switched by an actuator not shown in figures.

In the above described embodiments, a program of the CPU 801 for realizing the functions of the embodiments is previously stored in a memory not shown in figures. For example, a configuration may also be adopted in which a program for realizing the functions of the above described embodiments is stored in advance on a computer-readable storage medium, and in which the CPU 801 reads and executes a program code from the storage medium. For example, a flexible disk, a hard disk, an optical disk, a magneto-optical disk, a CD-ROM, a CD-R, a magnetic tape, a non-volatile memory card, a ROM, and a DVD can be used as the storage medium for supplying the program code.

Although the foregoing embodiments were described on the premise of a configuration of an image forming apparatus that forms monochrome images, the present invention can also be applied to a color image forming apparatus. The color image forming apparatuses to which the present invention can be applied include a color image forming apparatus employing a transfer method in which photosensitive drums serving as image bearing members for forming images of the respective colors of yellow, magenta, cyan, and black are arranged side by side, and the images are transferred from the respective photosensitive drums onto a recording material or onto an intermediate transfer member. The present invention can also be applied to a color image forming apparatus employing a transfer method in which images of respective colors are formed in sequence on a single image bearing member (photosensitive drum), and a color image is formed on an intermediate transfer member and transferred to a recording material.

As described above, according to the other embodiments also, similarly to the foregoing embodiments, overwriting printing can be performed on an original sheet while reducing the influence on the original sheet and the image forming unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096889, filed May 2, 2013, which is hereby incorporated by reference herein in its entirety.

What is claimed is:

1. An image forming apparatus comprising:
    an image forming unit that forms an image on a recording material;
    a reading unit that reads an original sheet;
    a first original sheet conveyance path in which an original sheet fed from a feeding unit in which original sheets are stacked is conveyed;

a second original sheet conveyance path in which the original sheet whose first and second sides are read by the reading unit is conveyed to a discharging unit that stacks discharged original sheets;

a common conveyance path in which a recording material or the original sheet is conveyed so that an image is formed on a second side of the recording material in which an image is formed on a first side by the image forming unit, or the first side of the original sheet conveyed from the first original sheet conveyance path is read by the reading unit;

a third original sheet conveyance path for conveying the original sheet conveyed in the second original sheet conveyance path to the common conveyance path, the third original sheet conveyance path connecting the first original sheet conveyance path and the second original sheet conveyance path; and a control unit that controls to convey the original sheet conveyed in the second original sheet conveyance path to the common conveyance path through the third original sheet conveyance path, and form an image on the original sheet by the image forming unit.

2. An image forming apparatus according to claim 1, comprising:

a first conveyance unit that conveys the original sheet to the discharging unit in the second original sheet conveyance path;

wherein by rotating the first conveyance unit in a rotational direction opposite to a predetermined rotational direction that is a direction in which the original sheet is conveyed to the discharging unit, the control unit reverses a conveying direction of the original sheet conveyed in the second original sheet conveyance path to convey the original sheet in the third original sheet conveyance path.

3. An image forming apparatus according to claim 2, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

4. An image forming apparatus according to claim 3, wherein, in a case where the original sheet is conveyed to the common conveyance path to form an image on the original sheet by the image forming unit, the control unit moves the reading unit to the position facing the second original sheet conveyance path.

5. An image forming apparatus according to claim 1, comprising a first switching unit that is capable of switching between a guide direction for conveying the original sheet whose first and second sides are read by the reading unit to the second original sheet conveyance path, and another guide direction for conveying the original sheet to the third original sheet conveyance path;

wherein the control unit causes the original sheet to be conveyed to the third original sheet conveyance path by switching a guide direction of the first switching unit to the guide direction for conveying the original sheet to the third original sheet conveyance path.

6. An image forming apparatus according to claim 5, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

7. An image forming apparatus according to claim 6, wherein, in a case where the original sheet is conveyed to the common conveyance path to form an image on the original sheet by the image forming unit, the control unit moves the reading unit to the position facing the second original sheet conveyance path.

8. An image forming apparatus according to claim 1, comprising:

a second switching unit that is capable of switching between a guide direction for conveying the original sheet whose first and second sides are read by the reading unit to the second original sheet conveyance path, and another guide direction for conveying the original sheet to the third original sheet conveyance path; and a second conveyance unit that conveys the original sheet in the first original sheet conveyance path;

wherein the control unit controls the second switching unit to convey the original sheet in the third original sheet conveyance path by switching a guide direction of the second switching unit to the guide direction for conveying the original sheet in the third original sheet conveyance path, to convey the original sheet from the third original sheet conveyance path to the first original sheet conveyance path by directing the second conveyance unit in a direction opposite to a predetermined rotational direction that is a direction in which the original sheet is conveyed from the feeding unit in the first original sheet conveyance path, and to convey the original sheet from the first original sheet conveyance path to the common conveyance path by directing the second conveyance unit in the predetermined rotational direction.

9. An image forming apparatus according to claim 8, comprising a pair of feeding units that separates and feeds original sheets stacked on the feeding unit in the first original sheet conveyance path;

wherein, in a case where the original sheet is conveyed from the third original sheet conveyance path to the first original sheet conveyance path, the control unit separates the pair of feeding units.

10. An image forming apparatus according to claim 8, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

11. An image forming apparatus according to claim 9, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

12. An image forming apparatus according to claim 11, wherein, in a case where the original sheet is conveyed to the common conveyance path to form an image on the original sheet by the image forming unit, the control unit moves the reading unit to the position facing the second original sheet conveyance path.

13. An image forming apparatus according to claim 10, wherein, in a case where the original sheet is conveyed to the common conveyance path to form an image on the original sheet by the image forming unit, the control unit moves the reading unit to the position facing the second original sheet conveyance path.

14. An image forming apparatus according to claim 1, comprising:

a fourth original sheet conveyance path in which the original sheet whose first side is read by the reading unit is conveyed;

a third switching unit capable of switching between a guide direction for conveying the original sheet from the common conveyance path to the fourth original sheet conveyance path and a guide direction for conveying the original sheet from the fourth original sheet conveyance path to the second original sheet conveyance path; and a third conveyance unit that conveys the original sheet in the fourth original sheet conveyance path;

wherein the control unit controls the third switching unit, to convey the original sheet from the common conveyance path to the fourth original sheet conveyance path by switching the third switching unit to the guide direction for conveying the original sheet from the common conveyance path to the fourth original sheet conveyance path and directing the third conveyance unit in a predetermined rotational direction, and to convey the original sheet from the fourth original sheet conveyance path to the second original sheet conveyance path by switching the third switching unit to the guide direction for conveying the original sheet from the fourth original sheet conveyance path to the second original sheet conveyance path and directing the third conveyance unit in a rotational direction opposite to the predetermined rotational direction.

15. An image forming apparatus according to claim 14, wherein the fourth original sheet conveyance path is a U-turn conveyance path in which the recording material is conveyed to form an image on a second side of the recording material by the image forming unit.

16. An image forming apparatus according to claim 14, wherein the fourth original sheet conveyance path is a conveyance path in which the original sheet is conveyed in order to read the second side of the original sheet by the reading unit.

17. An image forming apparatus according to claim 14, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

18. An image forming apparatus according to claim 17, wherein, in a case where the original sheet is conveyed to the common conveyance path to form an image on the original sheet by the image forming unit, the control unit moves the reading unit to the position facing the second original sheet conveyance path.

19. An image forming apparatus according to claim 16, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

20. An image forming apparatus according to claim 19, wherein, in a case where the original sheet is conveyed to the common conveyance path to form an image on the original sheet by the image forming unit, the control unit moves the reading unit to the position facing the second original sheet conveyance path.

21. An image forming apparatus according to claim 15, comprising a conveyance path that branches from the U-turn conveyance path, and merges with the common conveyance path on an upstream side of a position at which the reading unit is provided, in a conveying direction of the original sheet whose second side is to be read.

22. An image forming apparatus according to claim 15, comprising a conveyance path that branches from the U-turn conveyance path on a downstream side in a conveying direction of the original sheet whose first side is read, and merges with the common conveyance path on an upstream side of a position at which the reading unit is provided in the conveying direction of the original sheet whose second side is to be read.

23. An image forming apparatus according to claim 15, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

24. An image forming apparatus according to claim 23, wherein, in a case where the original sheet is conveyed to the common conveyance path to form an image on the original sheet by the image forming unit, the control unit moves the reading unit to the position facing the second original sheet conveyance path.

25. An image forming apparatus according to claim 21, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

26. An image forming apparatus according to claim 25, wherein, in a case where the original sheet is conveyed to the common conveyance path to form an image on the original sheet by the image forming unit, the control unit moves the reading unit to the position facing the second original sheet conveyance path.

27. An image forming apparatus according to claim 22, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

28. An image forming apparatus according to claim 27, wherein, in a case where the original sheet is conveyed to the common conveyance path to form an image on the original sheet by the image forming unit, the control unit moves the reading unit to the position facing the second original sheet conveyance path.

29. An image forming apparatus according to claim 1, wherein the control unit moves the reading unit to a position facing the common conveyance path in a case where the reading unit reads the first side of the original sheet, and the control unit moves the reading unit to a position facing the second original sheet conveyance path in a case where the reading unit reads the second side of the original sheet.

30. An image forming apparatus according to claim 29, wherein, in a case where the original sheet is conveyed to the common conveyance path to form an image on the original sheet by the image forming unit, the control unit moves the reading unit to the position facing the second original sheet conveyance path.

31. An image forming apparatus according to claim 1, wherein the control unit forms an image on the original sheet by the image forming unit based on information of the original sheet read by the reading unit.

32. An image forming apparatus according to claim 1, wherein the control unit forms a predetermined image on the original sheet by the image forming unit.

33. An image forming apparatus according to claim 1, wherein a length of a path from the reading unit to the image forming unit is longer than a length in a conveying direction of an original sheet whose maximum size is conveyable in the apparatus.

* * * * *